United States Patent
Cai et al.

(10) Patent No.: US 10,860,165 B2
(45) Date of Patent: Dec. 8, 2020

(54) TRACKING METHOD AND APPARATUS FOR SMART GLASSES, SMART GLASSES AND STORAGE MEDIUM

(71) Applicant: NEXTVPU (SHANGHAI) CO., LTD., Shanghai (CN)

(72) Inventors: Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/669,919

(22) Filed: Oct. 31, 2019

(65) Prior Publication Data
US 2020/0097133 A1 Mar. 26, 2020

Related U.S. Application Data

(63) Continuation of application No. PCT/CN2019/107669, filed on Sep. 25, 2019.

(30) Foreign Application Priority Data

Sep. 26, 2018 (CN) .......................... 2018 1 1124723
Sep. 26, 2018 (CN) .......................... 2018 1 1124758
(Continued)

(51) Int. Cl.
*G06F 3/0481* (2013.01)
*G02B 27/01* (2006.01)
(Continued)

(52) U.S. Cl.
CPC ....... *G06F 3/0481* (2013.01); *G02B 27/0172* (2013.01); *G06F 3/147* (2013.01); *G06K 9/00671* (2013.01); *G02B 2027/0178* (2013.01)

(58) Field of Classification Search
CPC .. G02B 27/0172; G06F 3/147; G06K 9/00671
(Continued)

(56) References Cited

U.S. PATENT DOCUMENTS

| 6,677,987 B1 * | 1/2004 | Girod | G06F 3/0386 |
| | | | 348/171 |
| 7,623,115 B2 * | 11/2009 | Marks | G06F 3/017 |
| | | | 345/156 |

(Continued)

FOREIGN PATENT DOCUMENTS

| CN | 102175251 A | 9/2011 |
| CN | 105578058 A | 5/2016 |

(Continued)

OTHER PUBLICATIONS

Arditi, "Auditory Display of Coarse Optical Imagery: Concept for a Rehabilitation Aid for Blind Spatial Orientation", The 20th International Conference on Auditory Display (ICAD-2014), Jun. 22-25, 2014, 4 pages.

(Continued)

*Primary Examiner* — Prabodh M Dharia
(74) *Attorney, Agent, or Firm* — Kilpatrick Townsend & Stockton LLP

(57) ABSTRACT

The present disclosure discusses smart glasses. The smart glasses may capture an image and then identify one or more objects in the image. The object located at a predefined position or region in the image is informed to a user. With the method, rather than all of the objects in the image, the object at the predefined position or region is informed to a user, such that the informing efficiency of the smart glasses and user experience are improved.

19 Claims, 9 Drawing Sheets

(30) Foreign Application Priority Data

Sep. 26, 2018 (CN) .................... 2018 2 1571798 U
Sep. 26, 2018 (CN) .................... 2018 2 1572786 U

(51) Int. Cl.
G06K 9/00 (2006.01)
G06F 3/147 (2006.01)

(58) Field of Classification Search
USPC ........................... 345/8; 1/1; 348/171, 14.08
See application file for complete search history.

(56) References Cited

U.S. PATENT DOCUMENTS

| | | | |
|---|---|---|---|
| 9,602,806 B1* | 3/2017 | Stafford | H04N 13/194 |
| 10,695,167 B2* | 6/2020 | Van Heugten | A61F 2/1624 |
| 2013/0127980 A1* | 5/2013 | Haddick | G06F 3/013 |
| | | | 348/14.08 |
| 2014/0180451 A1* | 6/2014 | Marty | G09B 19/0038 |
| | | | 700/91 |
| 2015/0002676 A1* | 1/2015 | Yoo | G02B 27/017 |
| | | | 348/159 |
| 2016/0189249 A1* | 6/2016 | Meyer | G06Q 30/0277 |
| | | | 705/14.66 |
| 2018/0036175 A1 | 2/2018 | Rollend et al. | |
| 2018/0075660 A1* | 3/2018 | Jouet | G06T 19/006 |
| 2018/0095533 A1* | 4/2018 | Song | H04N 5/23238 |
| 2018/0197223 A1* | 7/2018 | Grossman | G06Q 30/0625 |
| 2018/0350056 A1* | 12/2018 | Bernal | B25J 9/1697 |
| 2019/0121522 A1* | 4/2019 | Davis | G06F 3/04817 |
| 2019/0200058 A1* | 6/2019 | Hall | H04N 21/4667 |
| 2019/0223958 A1* | 7/2019 | Kohli | A61B 34/20 |
| 2019/0250601 A1* | 8/2019 | Donahoe | G05D 1/101 |

FOREIGN PATENT DOCUMENTS

| | | |
|---|---|---|
| CN | 106470277 A | 3/2017 |
| CN | 107007437 A | 8/2017 |
| CN | 107278301 A | 10/2017 |
| CN | 208689267 U | 4/2019 |
| CN | 208722145 U | 4/2019 |
| EP | 3096209 A2 | 11/2016 |
| JP | 2012169824 A | 9/2012 |
| JP | 2015097081 A | 5/2015 |
| JP | 2016033764 A | 3/2016 |
| JP | 2017138995 A | 8/2017 |
| JP | 2018106611 A | 7/2018 |
| WO | 2015198284 A1 | 12/2015 |
| WO | 2016199248 A1 | 12/2016 |
| WO | 2017098822 A1 | 6/2017 |

OTHER PUBLICATIONS

Meijer, "The vOICe for Android: Mobile Augmented Reality for a New Way of Seeing . . . with your ears!", Augmented Reality for the Blind? There . . . , Available Online at https://web.archive.org/web/20180329051911/https://www.seeingwithsound.com/android.htm, Dec. 2, 2020, 10 pages.

Tian, et al., "Detecting Good Quality Frames in Videos Captured by a Wearable Camera for Blind Navigation", IEEE International Conference on Bioinformatics and Biomedicine, 2013, 4 pages.

* cited by examiner

TRACKING METHOD AND APPARATUS FOR SMART GLASSES, SMART GLASSES AND STORAGE MEDIUM

CROSS-REFERENCES TO RELATED APPLICATIONS

This application claims priority to and is a continuation of International Patent Application No. PCT/CN2019/107669, filed Sep. 25, 2019; which claims priority from Chinese Patent Application Nos. CN 201811124758.0 filed Sep. 26, 2019; CN 201821571798.5 filed Sep. 26, 2019; CN 201811124723.7 filed Sep. 26, 2019; and CN 201821572786.4 filed Sep. 26, 2019. The entire contents of which are incorporated by reference herein in their entirety for all purposes.

TECHNICAL FIELD

The present disclosure relates to the field of smart devices, and in particular to a smart glasses tracking method and apparatus, smart glasses, and a storage medium.

DESCRIPTION OF THE RELATED ART

Currently there exist smart glasses designed for visually impaired users to facilitate the life thereof. The smart glasses can collect image information, and can inform a user, who wears them, of the content in a current image, thereby providing convenience to the life of the visually impaired users.

However, the inventors of the present invention have found that during the use of the smart glasses, the user cannot actively select the interactive center of the glasses, and in this case, the smart glasses usually inform the user of all of the information in an image at the same time, and cannot immediately focus accurately onto the range of characters and objects that need to be recognized. A recognized point can only be directed to with the aid of an external physical device (for example, a finger), similarly to the case where an external instruction is given to the device, and then the device can complete its function only according to the instruction.

Consequently, the current smart glasses have a relatively low informing efficiency, and make it impossible for a user to perceive the location of an object in the field of view, resulting in a poor user experience.

BRIEF SUMMARY OF THE INVENTION

In view of the above-mentioned defects or shortcomings in the prior art, the present disclosure provides a smart glasses tracking method and apparatus, smart glasses, and a storage medium, which improve the informing efficiency of the smart glasses and user experience.

According to a first aspect of the present disclosure, a smart glasses tracking method is provided, comprising: capturing an image; identifying one or more objects in the image; and informing a user of an object located at a predefined position or region in the image.

According to a second aspect of the present disclosure, a smart glasses tracking apparatus is provided, comprising: a capturing unit for capturing an image; an identification unit for identifying one or more objects in the image; and an informing unit for informing a user of an object located at a predefined position or region in the image.

According to a third aspect of the present disclosure, smart glasses are provided, comprising: a processor, a camera, and a voice playing apparatus, wherein the camera is configured to capture an image; the processor is configured to obtain the image captured by the camera, and to identify one or more objects in the image; and the voice playing apparatus is configured to inform a user of an object located at a predefined position or region in the image.

According to a fourth aspect of the present disclosure, smart glasses are provided, comprising: a processor and a memory, the memory having program instructions stored thereon that, when executed by the processor, cause the smart glasses to perform the method of any aspect of the present disclosure.

According to a fifth aspect of the present disclosure, a computer readable storage medium is provided, which has program instructions stored thereon that, when executed by a processor of smart glasses, cause the smart glasses to perform the method of any aspect of the present disclosure.

According to a sixth aspect of the present disclosure, a computer program product is provided, which comprises program instructions that, when executed by a processor of smart glasses, cause the smart glasses to perform the method of any aspect of the present disclosure.

It should be understood that the above-mentioned description is merely a brief summary of the technical solutions of the present disclosure so that the technical means of the present disclosure can be more clearly understood, and therefore can be implemented according to the content of the description. To make the above and other objects, features and advantages of the present disclosure clearer and easier to understand, particular embodiments of the present disclosure are described below by way of specific examples.

BRIEF DESCRIPTION OF THE DRAWINGS

After reading the following detailed description of exemplary embodiments, those of ordinary skill in the art will understand the advantages and benefits described herein and other advantages and benefits. The accompanying drawings are merely for illustrating the exemplary embodiments, and should not be considered as limitations on the present disclosure. Moreover, throughout the accompanying drawings, the same numerals represent the same components. In the drawings.

DETAILED DESCRIPTION OF THE INVENTION

Exemplary embodiments of the present disclosure will be described in more detail below with reference to accompanying drawings. Although the exemplary embodiments of the present disclosure are shown in the accompanying drawings, it should be understood that the present disclosure can be implemented in various forms and should not be limited to the embodiments illustrated herein. Rather, these embodiments are provided so that the present disclosure can be more thoroughly understood and that the scope of the present disclosure can be fully conveyed to those skilled in the art.

In the present disclosure, it should be understood that the terms such as "comprise" or "have" are intended to indicate the existence of the features, numbers, steps, acts, components, and parts or a combination thereof disclosed in the description, and are not intended to exclude a possibility that there are one or more other features, numbers, steps, acts, components, and parts or a combination thereof.

The embodiments of the present disclosure provide a smart glasses tracking method and apparatus, smart glasses, and a storage medium, in which after an image is captured, one or more objects in the image are identified, and an object located at a predefined position or region in the image is informed to a user. By means of the method, rather than all of the objects in the image, the object at the predefined position or region is informed to a user, such that the informing efficiency of the smart glasses and user experience are improved.

The embodiments of the present disclosure provide a smart glasses tracking method and apparatus, smart glasses, and a storage medium. The method involves capturing an image and detecting an impact point of laser light in the image, identifying an object at the impact point of the laser light in the image, and then informing a user of the object at the impact point of the laser light, which improves the informing efficiency of the smart glasses and user experience since the object at the detected position of the impact point of the laser light, rather than all of the objects in the image, is informed to the user.

In the present disclosure, a predefined position or region in an image may also be referred to as a predefined focus position or region in the image, and correspondingly, a smart glasses tracking method may also be referred to as a smart glasses focus tracking method.

Although the present disclosure is described below by using smart glasses as an example in some embodiments, those skilled in the art may understand that the smart glasses in these embodiments may also be replaced with other wearable devices or other electronic devices.

It should be additionally noted that the embodiments in the present disclosure and the features in the embodiments can be combined with each other without conflict. The present disclosure will be described in detail below with reference to the accompanying drawings and in conjunction with the embodiments.

Figure 1:
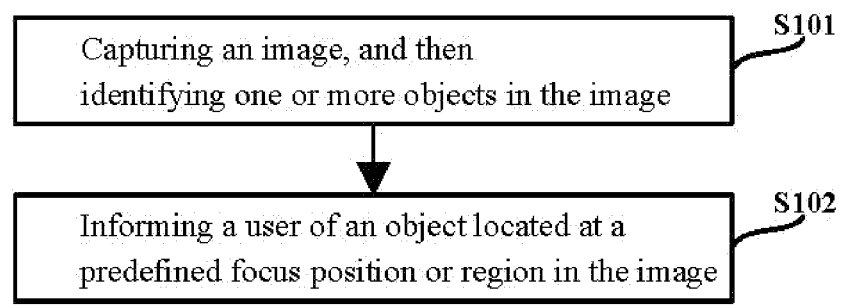
FIG. 1 is a flow chart of a smart glasses tracking method provided in an exemplary embodiment of the present disclosure.

In FIG. 1, it is shown a smart glasses focus tracking method provided in an embodiment of the present disclosure. The method comprises: step S101: identifying one or more objects in an image after capturing the image; and step S102: informing a user of an object located at a predefined focus position or region in the image.

By means of the smart glasses focus tracking method, rather than all of the objects in the image, the object at the predefined focus position or region is informed to the user, such that the informing efficiency of smart glasses and the user experience are improved.

The object in step S101 may be any object, or may be a pre-defined specified object.

Further, it may be difficult for a visually impaired user to make smart glasses well focus on a target object, and in the case where there is no object at the predefined focus position or region in the image, it may prompt the user to turn the head or prompt the user that there is no object at the predefined focus position or region in the image.

After hearing the prompt to turn the head or that there is no object, the user may randomly turn the head to search for the object.

Furthermore, to facilitate the user in searching for the object, when there is no object at the predefined focus position or region in the image, the location of the object in the image may be determined, and the user is prompted to turn the head towards the location of the object. For example, if there is a character or a two-dimensional code on the left of a focus in the image, it may prompt the user that there is a character or a two-dimensional code on the left of the focus, to enable the user to turn the head to the left.

During the turning of the user's head, the tone of the prompt may be changed according to the proximity of the object with respect to the predefined focus position or region in the image, so as to facilitate the visually impaired user in determining the degree for turning the head and more accurately positioning the focus. In this case, the user may turn the head according to the prompted location of the object, or the user may randomly turn the head to search for the object.

For example, the prompt tone may become quicker when the object is in increasingly proximity with the predefined focus position or region in the image, so that the user determines whether the direction of turning the head is correct and whether the degree of turning the head is proper. Alternatively, the user may be reminded, by another voice prompt having uniqueness, of whether the object has reached the center of a capture range.

Figure 2:
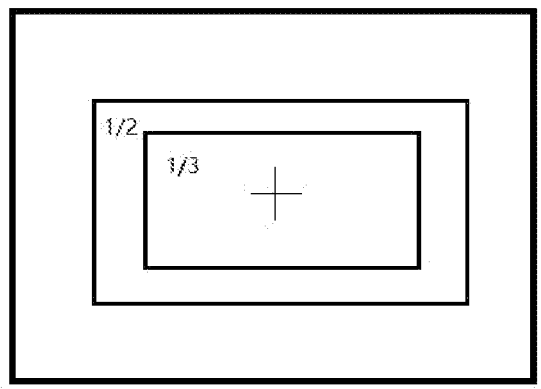
FIG. 2 is a schematic diagram of a position defined in an image and a region defined in an image provided in an exemplary embodiment of the present disclosure.

As shown in FIG. 2, the predefined focus position in the image may be specifically a central position in the image. The predefined focus region in the image may be specifically a circular or rectangular region at the center of the image that has an area of ⅓ to ½ of the entire image area. Those skilled in the art may adjust initial settings of the range of the predefined focus position in the image and the predefined focus region in the image according to actual conditions, and the user may also adjust the range of the predefined focus position in the image and the predefined focus region in the image according to his/her usage habits.

Figure 3:
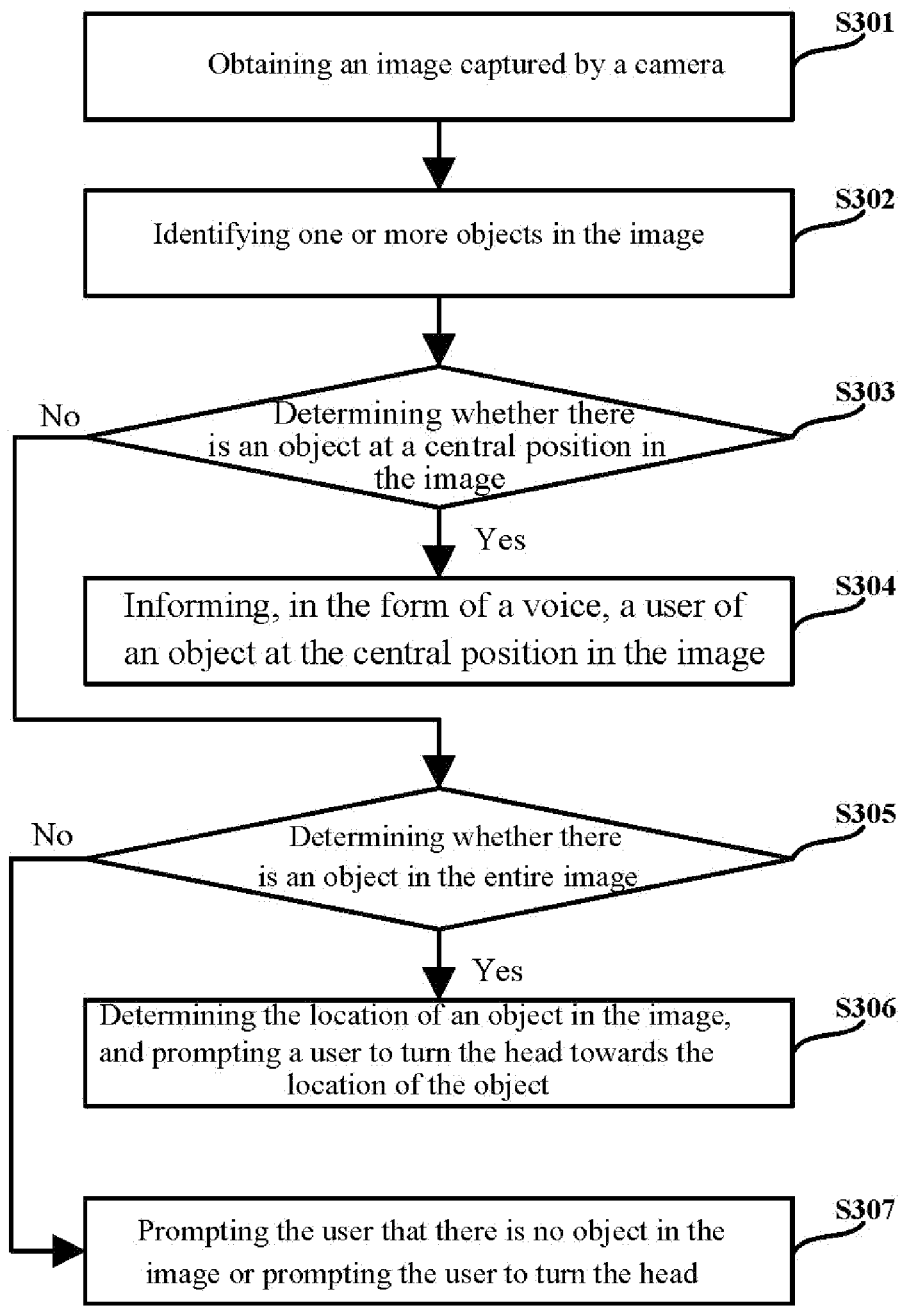
FIG. 3 is a flow chart of a smart glasses tracking method provided in another exemplary embodiment of the present disclosure.

A smart glasses focus tracking method provided in another embodiment of the present disclosure, as shown in FIG. 3, comprises: step S301: obtaining an image captured by a camera; step S302: identifying one or more objects in the image; step S303: determining whether there is an object at a central position in the image, and if so, performing step S304, otherwise, performing step S305; step S304: informing, in the form of a voice, a user of the object at the central position in the image; step S305: determining whether there is an object in the entire image, and if so, performing step S306, otherwise, performing step S307; step S306: determining the location of an object in the image, and prompting the user to turn the head towards the location of the object; and step S307: prompting the user that there is no object in the image or prompting the user to turn the head.

In step S301, the camera usually captures an image when smart glasses are in a relatively stable state. If the smart glasses are moving at a relatively high speed, the camera usually does not capture any image. The head turning condition of the user may be determined through a movement speed and acceleration of the smart glasses.

In step S303, it may determine only whether there is an object at the central position in the image, and it may also determine whether there is an object at the central position and a predefined region around the central position in the image.

In step S307, after prompting the user that there is no object in the image, the user may randomly turn the head according to the prompt so as to search for the object.

The user may also determine whether to enable or disable the prompt functions in steps S306 and S307. If the user has not enabled the prompt, then the user may determine that there is no object in the image unless being informed of an object, and then the user may randomly turn the head so as to search for the object.

With the smart glasses, if wanting to learn about environmental information, the user may turn the head to learn about information of an object in a specific location. For example, after arriving in a hall and wanting to learn about the layout of the hall and about the things in the hall, a visually impaired user may turn the head to learn about information of an object in a particular location. Characters and two-dimensional codes are special information. For example, if there is a character at the center of the image, the character is directly informed to the user. If the character is on the left of the central region, a prompt is given that there is a character on the left, and the user may turn the head to the left; and when the character reaches the center of the image, the character is informed to the user.

The predefined focus position in the image may be marked or not according to the user's setting. For a wearable device (such as VR) used by a user with normal vision, the predefined focus position in the image may be marked with a cross mark, as shown in FIG. 2, to illustrate the point as a center point of the visual image such that the user makes a determination and adjustment. For a visually impaired user, it may not be marked.

Similarly, the predefined focus region in the image may also be marked or not according to the user's setting. For a wearable device (such as VR) used by a user with normal vision, the predefined focus region in the image may be framed out with a special frame, such as a red frame, to illustrate the region as a central region of a visual image such that the user makes a determination and adjustment. For a visually impaired user, the predefined focus region in the image may not be marked.

When there is feature information (for example, feature information such as a character and a two-dimensional code) at the predefined focus position in the image (or a region around the position, with an area of ⅓ to ½ (the ratio is adjustable) of the entire image area), the information is directly informed to the user.

Figure 4:
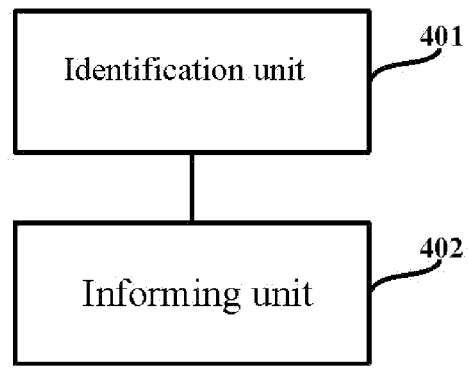
FIG. 4 is a schematic structural diagram of a smart glasses tracking apparatus provided in an exemplary embodiment of the present disclosure.

An embodiment of the present disclosure further correspondingly provides a smart glasses focus tracking apparatus, which, as shown in FIG. 4, comprises: an identification unit 401 for identifying one or more objects in an image after capturing the image; and an informing unit 402 for informing a user of an object located at a predefined focus position or region in the image.

Further, the informing unit 402 is further used for prompting the user to turn the head or prompting the user that there is no object at the predefined focus position or region in the image when there is no object at the predefined focus position or region in the image.

Furthermore, the informing unit 402 prompting the user to turn the head when there is no object at the predefined focus position or region in the image, specifically comprises: when there is no object at the predefined focus position or region in the image, determining the location of an object in the image, and prompting the user to turn the head towards the location of the object.

Furthermore, the informing unit 402 is further used for: changing, when the user turns the head, the tone of the prompt according to the proximity of the object with respect to the predefined focus position or region in the image.

Further, the predefined focus position in the image is specifically a central position in the image.

The predefined focus region in the image is specifically a circular or rectangular region at the center of the image that has an area of ⅓ to ½ of the entire image area.

Figure 5:
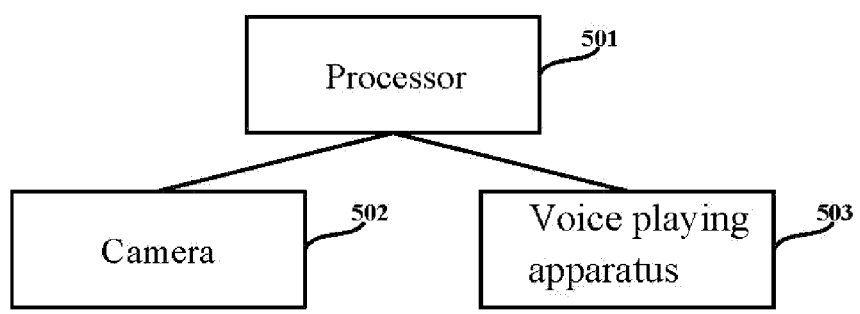
FIG. 5 is a schematic structural diagram of smart glasses provided in an exemplary embodiment of the present disclosure.

An embodiment of the present disclosure further provides smart glasses, which, as shown in FIG. 5, comprise: a processor 501, a camera 502, and a voice playing apparatus 503.

The processor 501 is connected to the camera 502 and the voice playing apparatus 503. An image is captured by the camera 502. After one or more objects in the image are identified by the processor 501, an object located at a predefined focus position or region in the image is informed to a user by the voice playing apparatus 503.

The voice playing apparatus 503 may be a loudspeaker.

Figure 6:
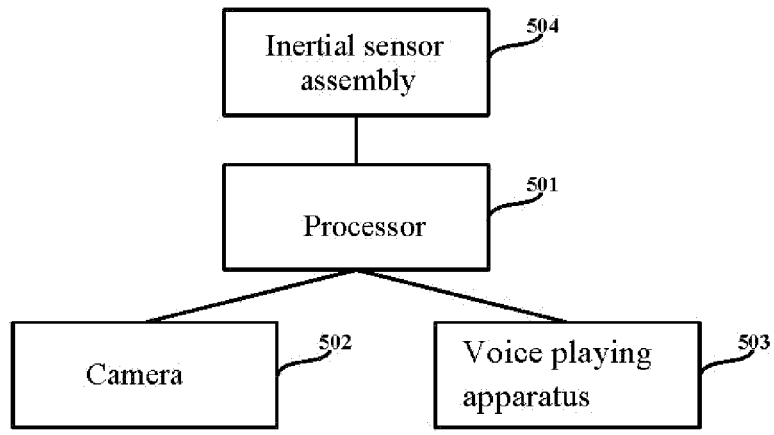
FIG. 6 is a schematic structural diagram of smart glasses provided in another exemplary embodiment of the present disclosure.

Further, as shown in FIG. 6, the smart glasses may further comprise: an inertial sensor assembly 504 for determining a movement state of the smart glasses, the inertial sensor assembly 504 being connected to the processor 501.

Furthermore, the inertial sensor assembly 504 comprises one or a combination of: a speed sensor for determining a movement speed of the smart glasses; an acceleration sensor for determining a movement speed of the smart glasses; and a gyroscope for determining information of an included angle between a vertical axis of the smart glasses and a vertical line (a line toward to the earth's core).

By means of the smart glasses focus tracking method and apparatus, the smart glasses, and the storage medium provided in the embodiments of the present disclosure, an object at a predefined focus position or focus region in a field of view may be informed to a user, so as to prevent informing the user of all of the objects in the field of view and it may prompt the user the location of the object, thereby facilitating the user in tracking the object and improving the usage experience of the user.

Figure 7:
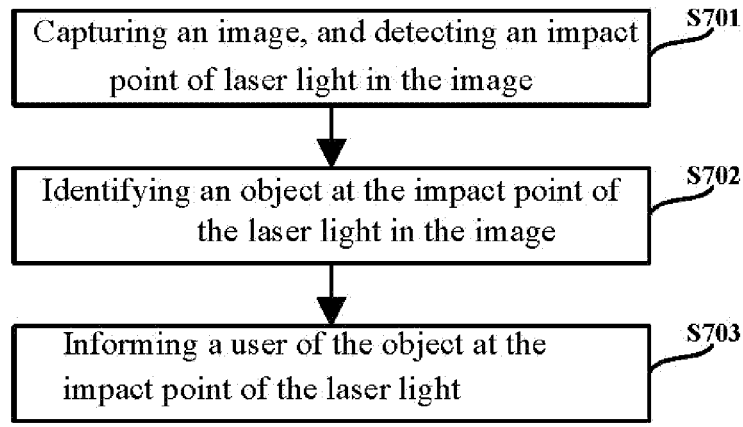
FIG. 7 is a flow chart of a smart glasses tracking method provided in still another exemplary embodiment of the present disclosure.

In FIG. 7, it is shown a smart glasses focus tracking method provided in still another embodiment of the present disclosure. The method comprises: step S701: capturing an image, and detecting an impact point of laser light in the image; step S702: identifying an object at the impact point of the laser light in the image; and step S703: informing a user of the object at the impact point of the laser light.

By means of the smart glasses focus tracking method, rather than all the objects in the image, the object located at the detected position of the impact point of the laser light is informed to the user, such that the informing efficiency of smart glasses and the user experience are improved.

The object in step S702 may be any object, or may be a pre-defined specified object.

For a relatively small or relatively distant object, an impact point of laser light may not accurately drop at the object, and in this case, a region may be further set around the impact point of the laser light, such that objects in the region are all directly identified and informed to the user, thereby further improving the usage experience of a user.

In this case, the method further comprises: identifying an object in a predefined region around the impact point of the laser light in the image; and informing the user of the object in the predefined region around the impact point of the laser light.

Further, it may be difficult for a visually impaired user to make smart glasses well focus on a target object, and in the case where there is no object at the impact point of the laser light or in the predefined region around the impact point of the laser light in the image, it may prompt the user to turn the head or prompt the user that there is no object at the impact point of the laser light or in the predefined region around the impact point of the laser light in the image.

Usually, when there is no object at the impact point of the laser light or in the predefined region around the impact point of the laser light in the image, the user may be prompted to turn the head, or a related voice prompt may be sent to the user that there is no object at the impact point of the laser light or in the predefined region around the impact point of the laser light. In this case, the user may randomly turn the head according to the voice prompt so as to search for the object. Similarly, when no object is identified in the entire image, the user may be prompted to turn the head, or a related voice prompt may be sent to the user that there is no object in the region of the image. In this case, the user may also randomly turn the head according to the voice prompt so as to search for the object.

Furthermore, when there is no object at the impact point of the laser light or in the predefined region around the impact point of the laser light in the image, the location of the object in the image is determined, and the user is prompted to turn the head towards the location of the object. For example, if there is a character or a two-dimensional code on the left of the impact point of the laser light in the image, it may prompt the user that there is a character or a two-dimensional code on the left of the impact point of the laser light, to enable the user to turn the head to the left.

When the user turns the head, the tone of the prompt may be changed according to the proximity of the object with respect to the impact point of the laser light or the predefined region around the impact point of the laser light, so as to facilitate the visually impaired user in determining the degree for turning the head, and more accurately positioning the focus. In this case, the user may turn the head according to the prompted location of the object, or the user may randomly turn the head to search for the object.

For example, the prompt tone may become quicker when the object is in increasingly proximity with the impact point of the laser light or the predefined region around the impact point of the laser light in the image, so that the user determines whether the direction of turning the head is correct and whether the degree of turning the head is proper. Alternatively, the user may be reminded, by another voice prompt having uniqueness, of whether the object has reached the impact point of the laser light or the predefined region around the impact point of the laser light.

According to the usage habits of most users, it is preferable that the impact point of the laser light is located in the central region of the image. However, when the angle of the camera and the laser emitter are relatively fixed, for a relatively close and a relatively distant object, coordinates of the impact point of the laser light in the image may not be exactly the same. Therefore, provided that the impact points of the laser light are located in the central region of the image as much as possible, the user may obtain a better usage experience.

Figure 8:
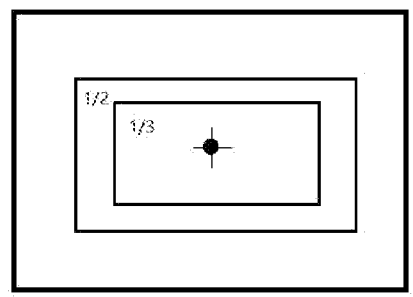
FIG. 8 is a schematic diagram of the position of an impact point of laser light in an image and a region defined around the position of the impact point of the laser light provided in another exemplary embodiment of the present disclosure.

As shown in FIG. 8, the impact point of the laser light may be at the central position in the image, and the predefined region around the impact point of the laser light may be specifically a circular or rectangular region around the impact point of the laser light that has an area of ⅓ to ½ of the entire image area. Those skilled in the art may adjust initial settings of the impact point of the laser light and the range of the predefined region around the impact point of the laser light according to actual conditions, and the user may also adjust the impact point of the laser light and the range of the predefined region around the impact point of the laser light according to his/her usage habits.

When a laser ray is a visible infrared ray, a red spot visible to the naked eyes will be presented at the impact point of the laser light. In this case, the position of the red spot can directly be identified in the captured image, that is, the position of the impact point of the laser light in the image may be determined. In this case, the step S701 of capturing the image and detecting an infrared laser spot in the image can be performed through the camera. However, when a visible infrared ray is used, other people in the environment may be interfered. Instead, a ray invisible to the naked eyes may be used, and in this case, an image may be captured by a first camera, the position of an impact point of laser light may be detected by a second camera, and the position of the impact point of the laser light in the captured image may be determined according to a preset correlation between the first camera and the second camera.

Preferably, prior to step S701, it may be determined that the movement speed of the smart glasses is less than a preset value, thereby avoiding interference with the user due to the capturing of an image during the turning of the user's head.

Figure 9:
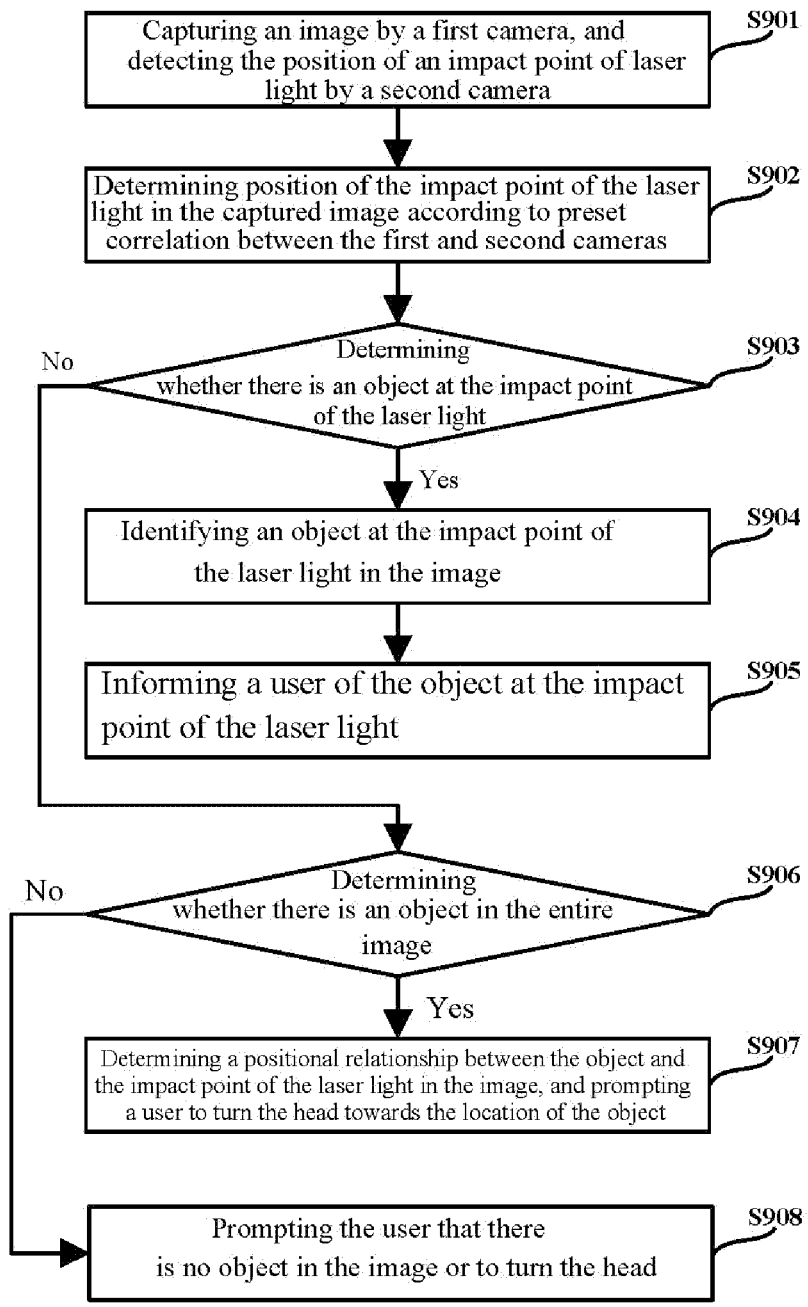
FIG. 9 is a flow chart of a smart glasses tracking method provided in yet another exemplary embodiment of the present disclosure.

In a preferred embodiment, a smart glasses focus tracking method provided in yet another embodiment of the present disclosure, as shown in FIG. 9, comprises: step S901: capturing an image by a first camera, and detecting the position of an impact point of laser light by a second camera; step S902: determining, according to a preset correlation between the first camera and the second camera, the position of the impact point of the laser light in the captured image; step S903: determining whether there is an object at the impact point of the laser light, and if so, performing step S904, otherwise, performing step S906; step S904: identifying an object at the impact point of the laser light in the image; step S905: informing a user of the object at the impact point of the laser light; step S906: determining whether there is an object in the entire image, and if so, performing step S907, otherwise, performing step S908; step S907: determining a positional relationship between the object and the impact point of the laser light in the image, and prompting the user to turn the head towards the location of the object; and step S908: prompting the user that there is no object in the image or to turn the head.

In step S901, the camera usually captures an image when smart glasses are in a relatively stable state. If the smart glasses are moving at a relatively high speed, the camera usually does not capture any image. The head turning condition of the user may be determined through a movement speed and acceleration of the smart glasses.

In step S903, it may determine only whether there is an object at the impact point of the laser light, and it may also determine whether there is an object at the impact point of the laser light and a predefined region around the impact point of the laser light.

In step S908, after prompting the user that there is no object in the image, the user may randomly turn the head according to the prompt so as to search for the object.

The user may also determine whether to enable or disable the prompt functions in steps S907 and S908. If the user has not enabled the prompt, then the user may determine that there is no object in the image unless being informed of an object, and then the user may randomly turn the head so as to search for the object.

With the smart glasses, if wanting to learn about environmental information, the user may turn the head to learn about information of an object in a specific location. For example, after arriving in a hall and wanting to learn about the layout of the hall and about the things in the hall, a visually impaired user may turn the head to learn about information of an object in a particular location. Characters and two-dimensional codes are special information. For example, if there is a character at the impact point of the laser light, the character is directly informed to the user. If the character is on the left of the impact point of the laser light, a prompt is given that there is a character on the left, and the user may turn the head to the left; and when the character reaches the impact point of the laser light, the character is informed to the user.

The position of the impact point of the laser light in the image may be marked or not according to the user's setting. For a wearable device (such as VR) used by a user with normal vision, the predefined focus position in the image may be marked with a cross mark, as shown in FIG. 8, to illustrate the point as the impact point of the laser light, i.e., a current image focus, such that the user makes a determination and adjustment. For a visually impaired user, it may not be marked.

Similarly, the predefined region around the position of the impact point of the laser light in the image may also be marked or not according to the user's setting. For a wearable device (such as VR) used by a user with normal vision, the predefined region around the position of the impact point of the laser light may be framed out with a special frame, such as a red frame, to illustrate the region as a focus region of a visual image such that the user makes a determination and adjustment. For a visually impaired user, the predefined region around the position of the impact point of the laser light may not be marked.

When there is feature information (for example, feature information such as a character and a two-dimensional code) at the position of the impact point of the laser light in the image (or a region around the position, with an area of ⅓ to ½ (the ratio is adjustable) of the entire image area), the information may be directly informed to the user.

Figure 10:
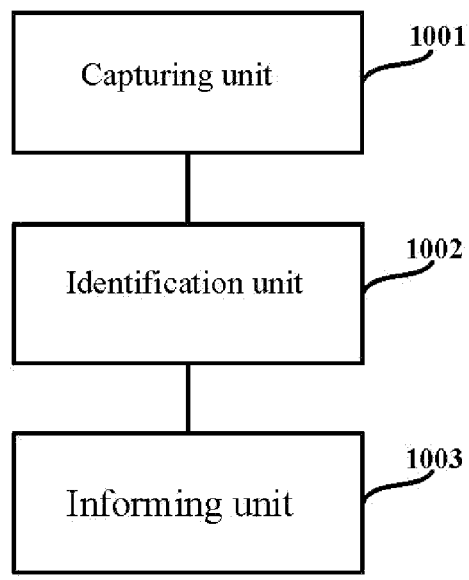
FIG. 10 is a schematic structural diagram of a smart glasses tracking apparatus provided in another exemplary embodiment of the present disclosure.

An embodiment of the present disclosure further correspondingly provides a smart glasses focus tracking apparatus, as shown in FIG. 10, which comprises: a capturing unit 1001 for capturing an image, and detecting an impact point of laser light in the image; an identification unit 1002 for identifying an object at the impact point of the laser light in the image; and an informing unit 1003 for informing a user of the object at the impact point of the laser light.

Further, the identification unit 1002 is further used for identifying an object in a predefined region around the impact point of the laser light in the image.

The informing unit 1003 is further used for informing the user of the object in the predefined region around the impact point of the laser light.

Further, the informing unit 1003 is further used for prompting the user to turn the head, when there is no object at the impact point of the laser light or in the predefined region around the impact point of the laser light in the image.

Furthermore, the informing unit 1003 prompting the user to turn the head when there is no object at the impact point of the laser light or in the predefined region around the impact point of the laser light in the image specifically comprises: when there is no object at the impact point of the laser light or in the predefined region around the impact point of the laser light in the image, determining the location of the object in the image, and prompting the user to turn the head towards the location of the object.

Furthermore, the informing unit 1003 is further used for: changing the tone of the prompt according to the proximity of the object with respect to the impact point of the laser light or the predefined region around the impact point of the laser light, when the user turns the head based on the prompted location of the object.

Preferably, the impact point of the laser light is located in the central region of the image.

Further, the capturing unit 1001 is specifically used for: capturing an image and detecting an infrared laser spot in the image by a camera; or capturing an image by a first camera, detecting the position of an impact point of laser light by a second camera, and determining, according to a preset correlation between the first camera and the second camera, the position of the impact point of the laser light in the captured image.

Preferably, the capturing unit 1001 is further used for: determining, before capturing the image and detecting the impact point of the laser light in the image, that a movement speed of the smart glasses is less than a preset value.

Figure 11:
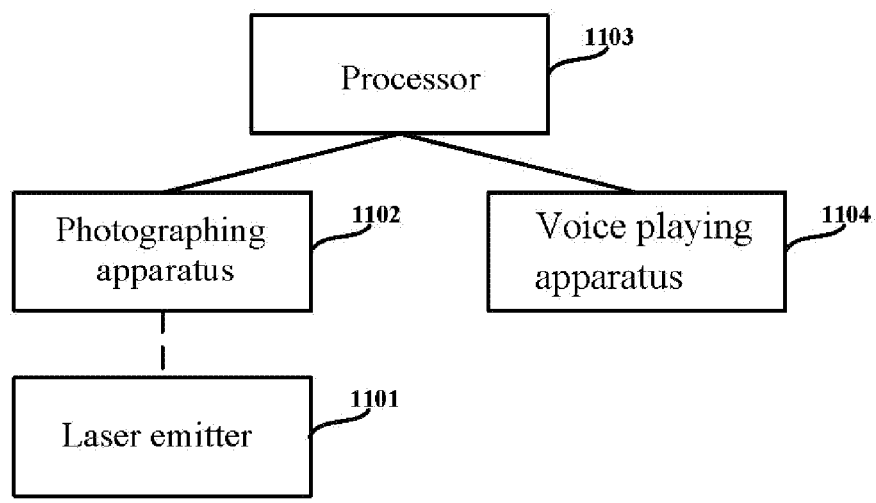
FIG. 11 is a schematic structural diagram of smart glasses provided in still another exemplary embodiment of the present disclosure.

An embodiment of the present disclosure further correspondingly provides smart glasses, which, as shown in FIG. 11, comprise: a laser emitter 1101 for emitting a laser ray; a photographing apparatus 1102 for capturing an image and detecting an impact point of laser light in the image; a processor 1103 for identifying an object at the impact point of the laser light in the image; and a voice playing apparatus 1104 for informing a user of the object at the impact point of the laser light.

The processor 1103 is connected to the photographing apparatus 1102 and the voice playing apparatus 1104.

The impact point of the laser light detected by the photographing apparatus 1102 is the impact point of the laser light emitted by the laser emitter 1101.

Figure 12:
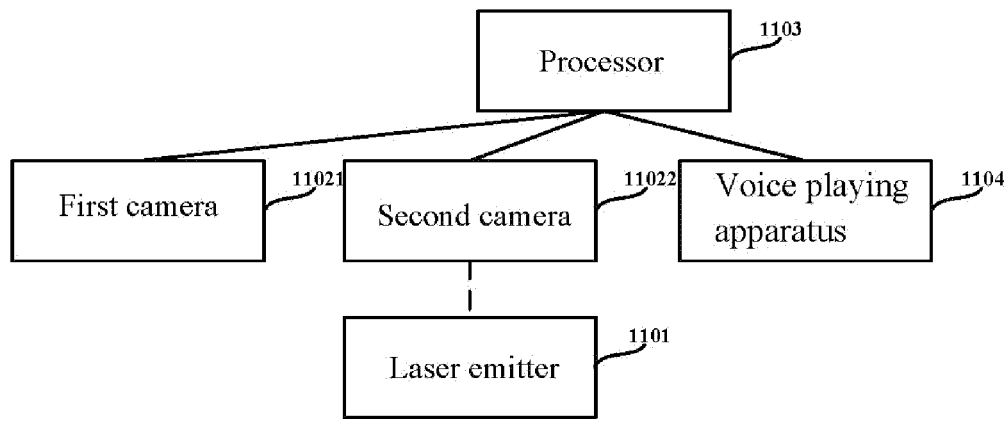
FIG. 12 is a schematic structural diagram of smart glasses provided in yet another exemplary embodiment of the present disclosure.

Further, as shown in FIG. 12, the photographing apparatus 1102 specifically comprises: a first camera 11021 for capturing an image; and a second camera 11022 for detecting an impact point of laser light.

The processor 1103 determines, according to a preset correlation between the first camera 11021 and the second camera 11022, the position of the impact point of the laser light detected by the second camera 11022 in the image captured by the first camera 11021.

Further, the laser emitter 1101 emits the laser ray in a direction that points to the central region of the image captured by the photographing apparatus 1102.

Further, the laser emitter 1101 may be an infrared emitter.

The voice playing apparatus 1104 may be a headphone or a loudspeaker.

Figure 13:
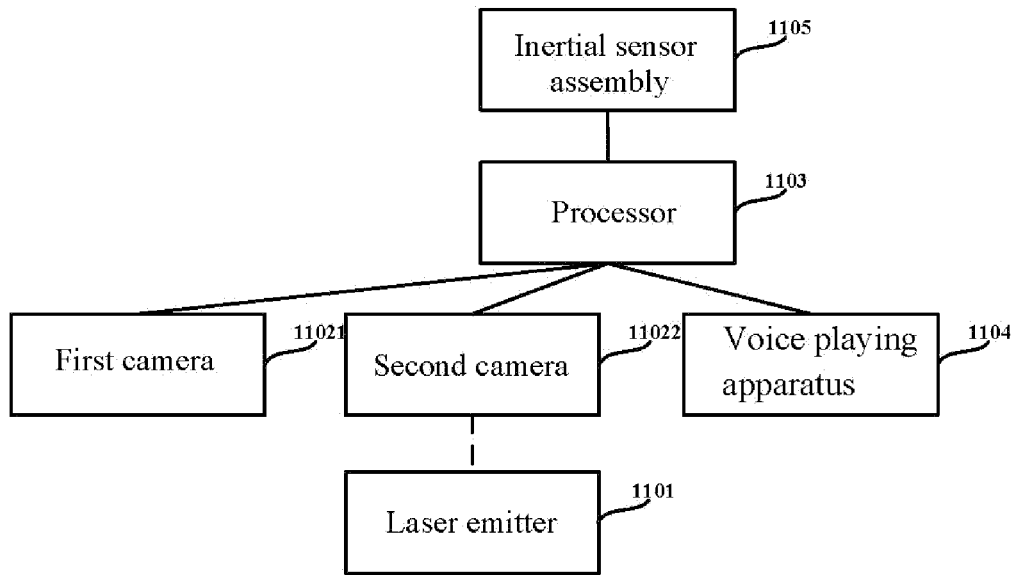
FIG. 13 is a schematic structural diagram of smart glasses provided in still yet another exemplary embodiment of the present disclosure.

Further, as shown in FIG. 13, the smart glasses further comprise:

an inertial sensor assembly 1105 for determining a movement state of the smart glasses, the inertial sensor assembly 1105 being connected to the processor 1103.

Further, the inertial sensor assembly 1105 may comprise one or a combination of:

a speed sensor for determining a movement speed of the smart glasses; an acceleration sensor for determining a movement speed of the smart glasses; and a gyroscope for determining information of an included angle between a vertical axis of the smart glasses and a vertical line (a line toward to the earth's core).

By means of the smart glasses focus tracking method and apparatus, the smart glasses, and the storage medium provided in the embodiments of the present disclosure, an object at an impact point of laser light in a field of view may be informed to a user, so as to prevent informing the user of all of the objects in the field of view and it may prompt the user the location of the object, thereby facilitating the user in tracking the object and improving the usage experience of the user.

Figure 14:
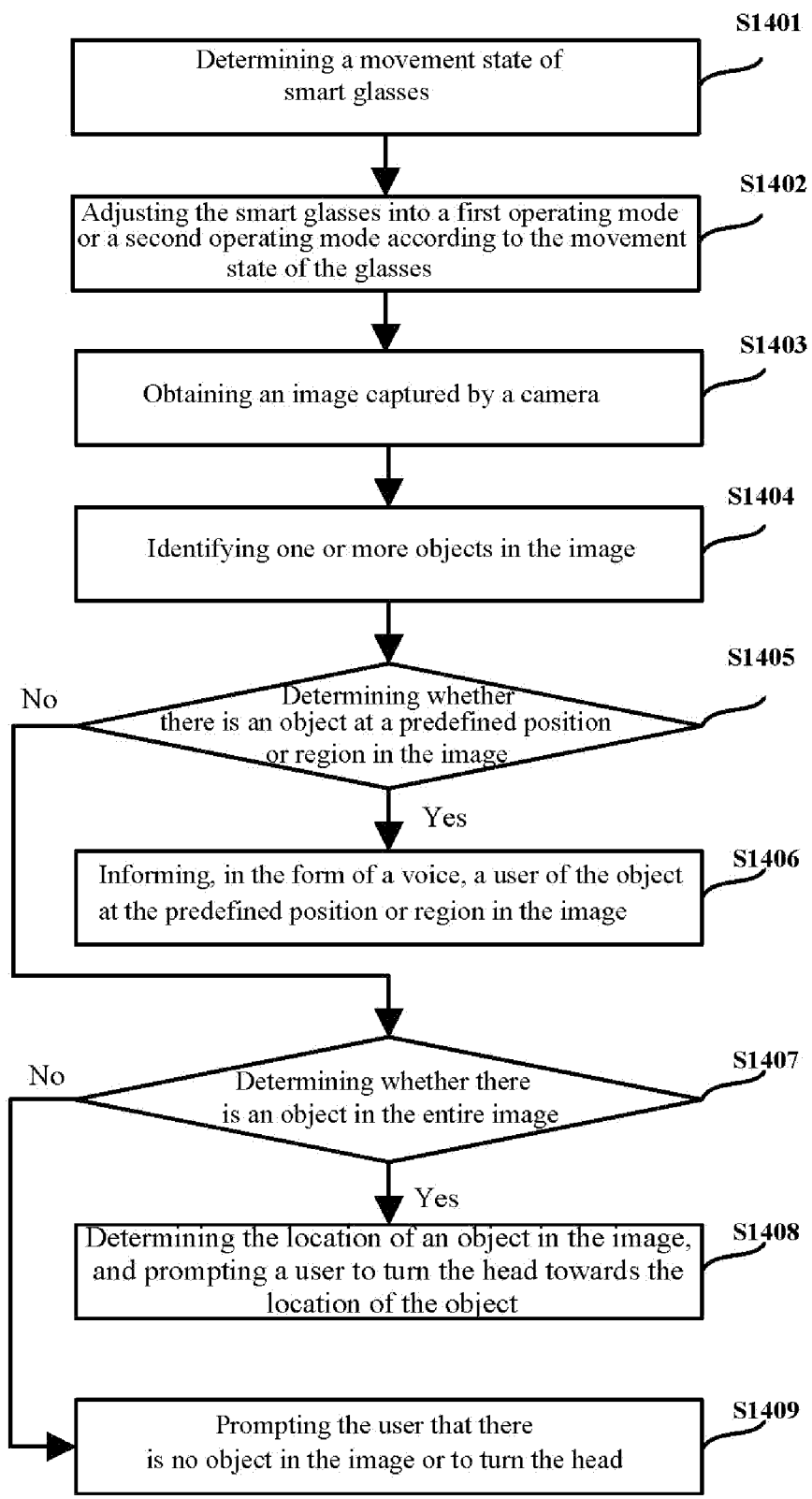
FIG. 14 is a flow chart of a smart glasses tracking method provided in still yet another exemplary embodiment of the present disclosure.

Another embodiment of the present disclosure provides a smart glasses tracking method. The steps of the method are described in detail blow, with reference to FIG. 14.

At step S1401, it is determined the movement state of the smart glasses.

The smart glasses may include a sensor, such as an inertial sensor, to determine its movement state.

For the user who wears the smart glasses and also carries a mobile device (such as a mobile phone and a smart band) with him/her, the movement state of the mobile device approximates the movement state of the smart glasses. Therefore, the smart glasses may be wirelessly connected to the mobile device that the user carries with him/her, to receive movement state information from the mobile device. Thus, the movement state of the smart glasses may be determined according to the movement state information received from the mobile device.

At step S1402, the smart glasses are adjusted into a first operating mode or a second operating mode according to the movement state of the smart glasses.

The operating mode of the smart glasses may be adjusted according to the movement speed of the user (or the smart glasses) such that the smart glasses is in the first operating mode or the second operating mode.

For example, when the movement speed of the user (or the smart glasses) falls within a first speed range, the smart glasses are adjusted into the first operating mode. When the movement speed of the user (or the smart glasses) falls within a second speed range, the smart glasses are adjusted into the second operating mode. The speeds in the first speed range are greater than the speeds in the second speed range. Alternatively, when the movement speed of the user (or the smart glasses) is less than a first preset value and greater than a second preset value, the smart glasses are adjusted into the first operating mode. When the movement speed of the user (or the smart glasses) is less than the second preset value, the smart glasses is adjusted into the second operating mode.

For example, a user (especially a visually impaired user), who is walking, may want the smart glasses to provide information of obstacles ahead, so as to avoid danger. In this case, the smart glasses may be adjusted into the first operating mode, so that the smart glasses may identify one or more objects in images, and informs the user of the objects at the predefined position or region in the images. The center point of the image or a region in the middle of the image corresponds to the position in front of the user, and therefore, the predefined position or region may be the center point of the image or the region in the middle of the image.

When the user stands still or moves slowly, the smart glasses may be adjusted into the second operating mode to determine whether there is a target object at the predefined position or region in the image. One example of the target object is a two-dimensional code or a bar code, and another example of the target object is a character or an object with a character. When the two-dimensional code or the character is at the predefined position or region in the image, the smart glasses may identify the two-dimensional code or read the character to the user.

For another example, a visually impaired user arrives in a hall and wants to learn about the layout of the hall and things in the hall. The visually impaired user may turn the head to learn about information of objects in the hall. In this case, the operating mode of the smart glasses may be adjusted according to the movement speed of the user's head. When the movement speed of the smart glasses is relatively high, the smart glasses may be made into the first operating mode so that the smart glasses identify one or more objects in images, and inform the user of the object at the predefined position or region in the images. When the movement speed of the glasses is relatively slow, which indicates that the head of the user moves slowly, the glasses are adjusted into the second operating mode to determine whether there is a target object, for example, special information such as characters or two-dimensional codes, at the predefined position or region in the image.

The predefined region in the image is, for example, a circular or rectangular region in the middle of the image, and the ratio of the area of the predefined region to the area of the entire image may be ⅓ to ½ or any other value.

At step S1403, the image captured by the camera is obtained.

At step S1404, one or more objects in the image captured by the camera are identified.

The smart glasses may identify the one or more objects in the image by using any method in the prior art. Alternatively, the smart glasses may send the image to the mobile device that the user carried with him/her, so that the mobile device identifies the one or more objects in the image. Then the smart glasses receive the identifying result from the mobile device.

At step S1405, it is determined whether there is an object at a predefined position or region in the image, and if so, step S1406 is performed, otherwise, step S1407 is performed.

As an example, determining whether there is an object at the predefined position or region in the image may include: according to the image identifying result, selecting from the identified objects an object at the predefined position or region in the image to be informed to the user, when the smart glasses are in the first operating mode; and determining whether there is a target object at the predefined position or region in the image when the glasses are in the second operating mode. The target object is, for example, a two-dimensional code or a character, and may be preset by the user.

The predefined position or region may be a center point of the image or a region in the middle of the image.

At step S1406, the object at the predefined position or region in the image may be informed to the user in the form of voice.

Informing, in the form of the voice, the user of the object at the predefined position or region in the image may include: informing, in the form of the voice, the user of the object at the predefined position or region in the image when the glasses are in the first operating mode, and informing, in the form of the voice, the user of the target object when the smart glasses are in the second operating mode.

At step S1407, it is determined whether there is an object in the entire image, and if so, step S1408 is performed, otherwise, step S1409 is performed.

When the smart glasses are in the second operating mode, if there is no target object at the predefined position or region in the image, a specific prompt tone may be generated for the user, and meanwhile it may be determined whether there is a target object at other position in the image.

When the smart glasses are in the first operating mode, step S1407 and subsequent steps may not be performed.

At step S1408, the location of an object in the image is determined, and the user is prompted to turn the head towards the location of the object.

When there is a target object at another position in the image, a movement direction of the smart glasses is determined according to a relative positional relationship between the target object and the predefined position or region in the image, and the user is prompted to move in the direction.

After prompting, if the user moves slowly, this indicates that the user wants to further position the target object; otherwise, if the user moves quickly, this indicates that the user does not want to further position the target object.

Therefore, during movement of the smart glasses, the movement speed of the smart glasses may be determined. When the movement speed of the smart glasses is less than a third preset value, the camera may capture one or more further images at a predetermined time interval. The smart glasses may calculate the distance between the target object and the predefined position or region in the captured image, and change the frequency and/or volume of the generated prompt tone according to the calculated distance. This process lasts until a captured image includes a target object at a predefined position or region thereof.

At step S1409, the user is prompted that there is no object in the image.

The predefined position or region in the image may also be determined by using other method. For example, a laser may be used for emitting laser light. The impact point of the laser light corresponds to the predefined position. The region around the impact point of the laser light corresponds to the predefined region. A camera or a photoelectric detector may be used to detect reflected laser light to determine the distance between the object (for example, the target object) at the predefined position or region in the image and the smart glasses.

When the light emitted by the laser is visible light, the position of the laser light in the image may be taken as the predefined position. When the light emitted by the laser is invisible light, a corresponding position of the impact point of the laser light in the captured image may be determined according to a preset correlation between the camera for captured images and the camera for detecting reflected laser light, and the position is taken as the predefined position in the image.

The flow charts and the block diagram in the accompanying drawings illustrate system architectures, functions, and operations of possible implementations of the method, the apparatus, and the computer readable storage medium according to various embodiments of the present disclosure. It should be noted that the steps represented by the blocks in the flow charts are not necessarily performed in the order indicated by the numerals, may be sometimes concurrently performed basically, or may be sometimes performed in a reverse order, which depends on the related functions. It should also be noted that each block in the block diagram and/or the flow chart, and a combination of the blocks in the block diagram and/or the flow chart may be implemented by hardware that executes specified functions or operations, or may be implemented by a combination of hardware and computer instructions.

The related units or modules described in the embodiments of the present disclosure may be implemented by means of software, or may be implemented by means of hardware.

Through the description of the embodiments above, those skilled in the art can clearly understand that the embodiments can be implemented by software and necessary general hardware platforms. Of course, the embodiments can also be implemented in hardware. Based on such understanding, the above technical solutions substantially, or the part(s) thereof making contributions to the prior art, can be embodied in the form of a software product, and the computer software product can be stored in a computer readable storage medium, such as a ROM/RAM, a magnetic disk, or an optical disk, which includes instructions to enable a computer device (which can be a personal computer, a server, or a network device, etc.) to execute the methods in embodiments or parts of the embodiments.

Figure 15:
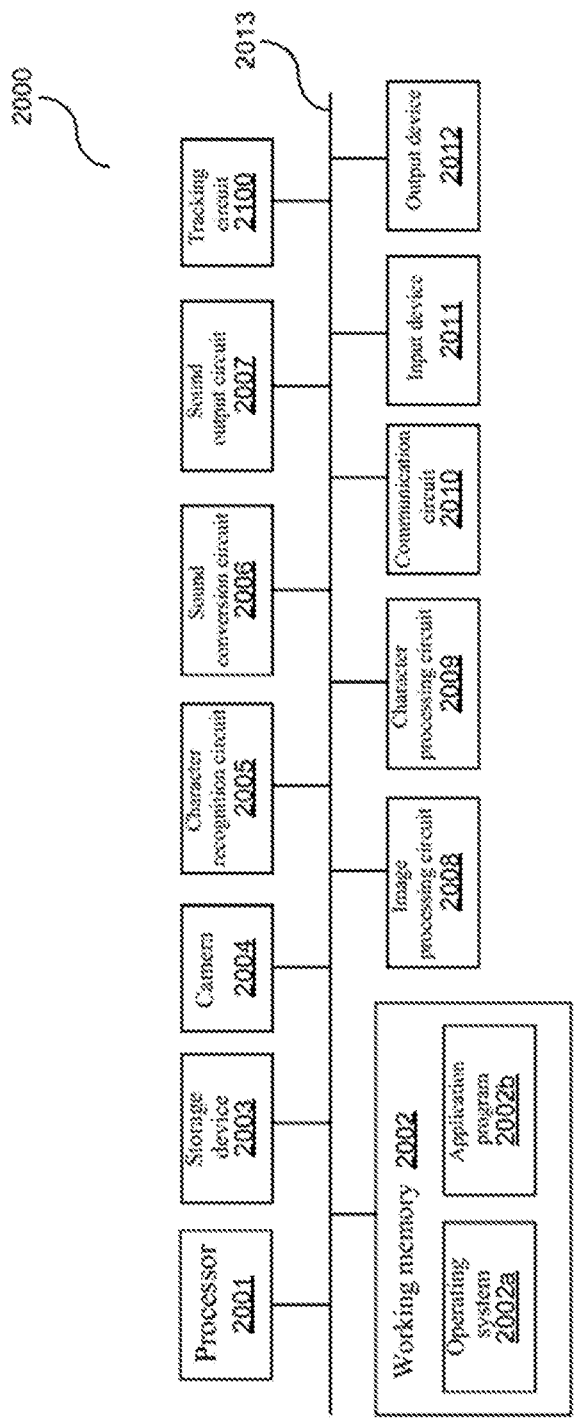
FIG. 15 is a block diagram showing an example of an electronic device according to an exemplary embodiment of the present disclosure.

FIG. 15 is a block diagram showing an example of an electronic device according to an exemplary embodiment of the present disclosure. The electronic device may be a visually impaired assisting device. The visually impaired assisting device may be smart glasses or a component of the smart glasses. It should be noted that the structure shown in FIG. 15 is merely an example, and according to a specific implementation, the electronic device in the present disclosure may include only one or more of constituent parts shown in FIG. 15.

The electronic device 2000 may be configured to photograph an image, process the photographed image, and provide an audio prompt in response to data obtained through the processing. For example, the electronic device 2000 may be configured to photograph an image, perform character detection and/or recognition on the image to obtain character data, convert the character data into sound data, and output the sound data for the user to listen.

According to some implementations, the electronic device 2000 may be configured to include an eyeglass frame or configured to be detachably installed on an eyeglass frame (for example, a rim of the eyeglass frame, a connecting piece that connects two rims, an eyeglass leg, or any other parts) so that an image that almost includes the field of view of the user can be photographed.

According to some implementations, the electronic device 2000 may also be installed on another wearable device, or may be integrated with another wearable device. The wearable device may be, for example: a head-mounted device (for example, a helmet or a hat), a device that can be worn on ears, etc. According to some embodiments, the electronic device may be implemented as accessories attached to a wearable device, for example, accessories attached to the helmet or the hat, etc.

The electronic device 2000 may comprise a camera 2004 for capturing an image. The electronic device 2000 may further comprise a character recognition circuit 2005, and the character recognition circuit 2005 is configured to perform character detection and/or recognition (for example, OCR processing) on characters contained in the image so as to obtain character data. The character recognition circuit 2005 may be implemented, for example, by a dedicated chip. The electronic device 2000 may further comprise a sound conversion circuit 2006, and the sound conversion circuit 2006 is configured to convert the character data into sound data. The sound conversion circuit 2006 may be implemented, for example, by a dedicated chip. The electronic device 2000 may further comprise a sound output circuit 2007, and the sound output circuit 2007 is configured to output the sound data. The sound output circuit 2007 may include, but is not limited to a headphone, a loudspeaker, or a vibrator, etc., and its corresponding drive circuit. The electronic device 2000 may further comprise a tracking circuit (an electronic circuit) 2100, and the tracking circuit (the electronic circuit) 2100 includes a circuit configured to perform the steps (for example, the method steps shown in the flow charts of FIGS. 1, 3, 7, 9, and 14) of the smart glasses tracking method as described above.

According to some implementations, the electronic device 2000 may further comprise an image processing circuit 2008, and the image processing circuit 2008 may comprise a circuit configured to perform various image processing on an image. The image processing circuit 2008 may include, for example, but is not limited to, one or more of: a circuit configured to perform noise reduction on an image, a circuit configured to perform defuzzification on an image, a circuit configured to perform geometric correction on an image, a circuit configured to perform feature extraction on an image, a circuit configured to perform object detection and/or identification on an object in an image, a circuit configured to perform character detection on a character contained in an image, a circuit configured to extract a text line from an image, a circuit configured to extract character coordinates from an image, a circuit configured to extract an object box from an image, a circuit configured to extract a text box from an image, a circuit configured to perform layout analysis (for example, paragraph division) based on an image, etc.

According to some implementations, the electronic device 2000 may further comprise a character processing circuit 2009, and the character processing circuit 2009 may be configured to perform various processing based on extracted character-related information (for example, character data, a text box, paragraph coordinates, text line coordinates, and character coordinates) so as to obtain processing results, such as paragraph sorting, character semantic analysis, and layout analysis results.

One or more of the above-mentioned various circuits (for example, the character recognition circuit 2005, the sound conversion circuit 2006, the sound output circuit 2007, the image processing circuit 2008, the character processing circuit 2009, and the tracking circuit 2100) may be implemented by using custom hardware, and/or hardware, software, firmware, middleware, microcodes, hardware description languages, or any combination thereof. For example, one or more of the circuits mentioned above may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in consistent with the present disclosure.

According to some implementations, the electronic device 2000 may further comprise a communication circuit 2010. The communication circuit 2010 may be any type of device or system that enables communication with an external device and/or a network, and may include, but is not limited to, a modem, a network card, an infrared communication device, a wireless communication device and/or a chipset, such as a Bluetooth device, a 1302.11 device, a WiFi device, a WiMax device, a cellular communication device, and/or the like.

According to some implementations, the electronic device 2000 may further comprise an input device 2011. The input device 2011 may be any type of device capable of inputting information to the electronic device 2000, and may include, but is not limited to, various sensors, a mouse, a keyboard, a touch screen, a button, a joystick, a microphone and/or a remote controller, etc.

According to some implementations, the electronic device 2000 may further comprise an output device 2012. The output device 2012 may be any type of device capable of presenting information, and may include, but is not limited to, a display, a visual output terminal, a vibrator and/or a printer, etc. Although the electronic device 2000 is used for a visually impaired assisting device according to some embodiments, a vision-based output device may facilitate a family member of the user, a maintenance staff, etc. in obtaining output information from the electronic device 2000.

According to some implementations, the electronic device 2000 may further comprise a processor 2001. The processor 2001 may be any type of processor and may include, but is not limited to, one or more general purpose processors and/or one or more dedicated processors (for example, special processing chips). The processor 2001 may be, for example, but is not limited to, a central processing unit (CPU) or a microprocessor unit (MPU). The electronic device 2000 may further comprise a working memory 2002. The working memory 2002 may be a working memory that stores programs (including instructions) and/or data (for example, an image, characters, a voice, and other intermediate data) useful to the working of the processor 2001, and may include, but is not limited to, a random access memory and/or read-only memory device. The electronic device 2000 may further comprise a storage device 2003. The storage device 2003 may comprise any non-transitory storage device. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or codes. The working memory 2002 and the storage device 2003 may be collectively referred to as "memories", and may be interchangeably used in some cases.

According to some implementations, the processor 2001 may control and schedule at least one of the camera 2004, the character recognition circuit 2005, the sound conversion circuit 2006, the sound output circuit 2007, the image processing circuit 2008, the character processing circuit 2009, the communication circuit 2010, the tracking circuit (the electronic circuit) 2100, and other various apparatuses and circuits in the electronic device 2000. According to some implementations, at least some of the constituent parts described in FIG. 15 may be interconnected and/or communicate with each other through a bus 2013.

Software elements (programs) may be located in the working memory 2002, and may include, but is not limited to, an operating system 2002a, one or more application programs 2002b, drivers, and/or other data and codes.

According to some implementations, the instructions for the above-mentioned control and scheduling may be comprised in the operating system 2002a or the one or more application programs 2002b.

According to some implementations, the instructions for performing the method steps (for example, the method steps shown in the flow charts of FIG. 1, FIG. 3, FIG. 7, FIG. 9, and FIG. 14) described in the present disclosure may be included in the one or more application programs 2002b, and the above-mentioned modules of the electronic device 2000 may be implemented by the processor 2001 reading and executing the instructions of the one or more application programs 2002b. In other words, the electronic device 2000 may comprise the processor 2001 and a memory (for example, the working memory 2002 and/or the storage device 2003) that stores a program, the program comprising instructions that, when executed by the processor 2001, cause the processor 2001 to carry out the method of various embodiments of the present disclosure.

According to some implementations, some or all of the operations performed by at least one of the character recognition circuit 2005, the sound conversion circuit 2006, the image processing circuit 2008, the character processing circuit 2009, and the tracking circuit (the electronic circuit) 2100 may be implemented by the processor 2001 reading and executing the instructions of the one or more application programs 2002.

Executable codes or source codes of the instructions of the software elements (programs) may be stored in a non-transitory computer readable storage medium (for example, the storage device 2003), and may be stored in the working memory 2001 when executed (may be compiled and/or installed). Therefore, the present disclosure provides a computer readable storage medium storing a program, the program including instructions that, when executed by a processor of an electronic device (for example, a visually impaired assisting device), cause the electronic device to carry out the method of various embodiments of the present disclosure. According to another implementation, the executable codes or source codes of the instructions of the software elements (programs) may also be downloaded from a remote position.

It should also be appreciated that various variations may be made according to specific requirements. For example, custom hardware may also be used, and/or various circuits, units, modules, or elements may be implemented in hardware, software, firmware, middleware, microcodes, hardware description languages, or any combination thereof. For example, some or all of the circuits, units, modules, or elements comprised in the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in consistent with the present disclosure.

According to some implementations, the processor 2001 in the electronic device 2000 may be distributed over a network. For example, some processing may be executed by one processor while other processing may be executed by another processor away from the one processor. Other modules of the electronic device 2001 may also be similarly distributed. As such, the electronic device 2001 can be interpreted as a distributed computing system that performs processing at a plurality of positions.

The aspects of the present disclosure may be understood from the following enumerated exemplary embodiments (EEE):

EEE 1. A smart glasses focus tracking method, comprising:
identifying one or more objects in an image after capturing the image; and
informing a user of an object located at a predefined focus position or region in the image.

EEE 2. The method according to EEE 1, further comprising:
when there is no object at the predefined focus position or region in the image, prompting the user to turn the head or prompting the user that there is no object at the predefined focus position or region in the image.

The method according to EEE 2, wherein when there is no object at the predefined focus position or region in the image, prompting the user to turn the head comprises:
when there is no object at the predefined focus position or region in the image, determining the location of an object in the image, and prompting the user to turn the head towards the location of the object.

EEE 4. The method according to EEE 2, further comprising:
changing, when the user turns the head, the tone of the prompt according to the proximity of the object with respect to the predefined focus position or region in the image.

EEE 5. The method according to EEE 1, wherein the predefined focus position in the image is a central position in the image; and
the predefined focus region in the image is a circular or rectangular region at the center of the image that has an area of ⅓ to ½ of that of the entire image.

EEE 6. A smart glasses focus tracking apparatus, comprising:
an identification unit for identifying one or more objects in an image after capturing the image; and
an informing unit for informing a user of an object located at a predefined focus position or region in the image.

EEE 7. The apparatus according to EEE 6, wherein the informing unit is further used for:
when there is no object at the predefined focus position or region in the image, prompting the user to turn the head or prompting the user that there is no object at the predefined focus position or region in the image.

EEE 8. The apparatus according to EEE 7, when there is no object at the predefined focus position or region in the image, prompting the user to turn the head comprises:
when there is no object at the predefined focus position or region in the image, determining the location of an object in the image, and prompting the user to turn the head towards the location of the object.

EEE 9. The apparatus according to EEE 7, wherein the informing unit is further used for:
changing, when the user turns the head, the tone of the prompt according to the proximity of the object with respect to the predefined focus position or region in the image.

EEE 10. The apparatus according to EEE 6, wherein the predefined focus position in the image is a central position in the image; and
the predefined focus region in the image is a circular or rectangular region at the center of the image that has an area of ⅓ to ½ of that of the entire image.

EEE 11. Smart glasses, comprising: a processor, a camera, and a voice playing apparatus, wherein
the processor is connected to the camera and the voice playing apparatus, to capture an image by using the camera and inform, by using the voice playing apparatus, a user of an object located at a predefined focus position or region in the image after identifying one or more objects in the image.

EEE 12. The smart glasses according to EEE 11, wherein the voice playing apparatus is a loudspeaker.

EEE 13. The smart glasses according to EEE 11, further comprising:
an inertial sensor assembly for determining a movement state of the smart glasses, the inertial sensor assembly being connected to the processor.

EEE 14. The smart glasses according to EEE 13, wherein the inertial sensor assembly comprises one or a combination of:
a speed sensor for determining a movement speed of the smart glasses;
an acceleration sensor for determining a movement speed of the smart glasses; and
a gyroscope for determining information of an included angle between a vertical axis of the smart glasses and a vertical line toward to the earth's core.

EEE 15. A computer readable storage medium, having a computer program stored thereon, the computer program being used for implementing the method of EEEs 1 to 5.

EEE 16. A smart glasses focus tracking method, comprising:
capturing an image, and detecting an impact point of laser light in the image;
identifying an object at the impact point of the laser light in the image;
informing a user of the object at the impact point of the laser light.

EEE 17. The method according to EEE 16, further comprising:
identifying an object in a predefined region around the impact point of the laser light in the image; and
informing the user of the object in the predefined region around the impact point of the laser light.

EEE 18. The method according to EEE 17, further comprising:
when there is no object at the impact point of the laser light or in the predefined region around the impact point of the laser light in the image, prompting the user to turn the head or prompting the user that there is no object at the impact point of the laser light or in the predefined region around the impact point of the laser light in the image.

EEE 19. The method according to EEE 18, wherein when there is no object at the impact point of the laser light or in the predefined region around the impact point of the laser light in the image, prompting the user to turn the head comprises:
when there is no object at the impact point of the laser light or in the predefined region around the impact point of the laser light in the image, determining the location of an object in the image, and prompting the user to turn the head towards the location of the object.

EEE 20. The method according to EEE 18, further comprising:
changing, when the user turns the head, the tone of the prompt according to the proximity of the object with respect to the impact point of the laser light or the predefined region around the impact point of the laser light.

EEE 21. The method according to EEE 16, wherein the impact point of the laser light is located in the central region of the image.

EEE 22. The method according to EEE 16, wherein capturing an image and detecting the impact point of the laser light in the image comprises:
capturing an image and detecting an infrared laser spot in the image by a camera; or capturing an image by a first camera, detecting the position of an impact point of laser light by a second camera, and determining, according to a preset correlation between the first camera and the second camera, the position of the impact point of the laser light in the captured image.

EEE 23. The method according to EEE 16, wherein before capturing the image and detecting the impact point of the laser light in the image, the method further comprises:
determining that a movement speed of the smart glasses is less than a preset value.

EEE 24. A smart glasses focus tracking apparatus, comprising:
a capturing unit for capturing an image, and detecting an impact point of laser light in the image;
an identification unit for identifying an object at the impact point of the laser light in the image; and
an informing unit for informing a user of the object at the impact point of the laser light.

EEE 25. Smart glasses, comprising:
a laser emitter for emitting a laser ray;
a photographing apparatus for capturing an image and detecting an impact point of laser light in the image;
a processor for identifying an object at the impact point of the laser light in the image; and
a voice playing apparatus for informing a user of the object at the impact point of the laser light, the processor being connected to the photographing apparatus and the voice playing apparatus.

EEE 26. The smart glasses according to EEE 25, wherein the photographing apparatus comprises:
a first camera for capturing an image; and
a second camera for detecting an impact point of laser light, the processor determining, according to a preset correlation between the first camera and the second camera, the position of the impact point of the laser light detected by the second camera in the image captured by the first camera.

EEE 27. The smart glasses according to EEE 25, wherein the laser emitter emits the laser ray in a direction that points to the central region of the image captured by the photographing apparatus.

EEE 28. The smart glasses according to EEE 25, wherein the laser emitter is an infrared emitter.

EEE 29. The smart glasses according to EEE 25, wherein the voice playing apparatus is a headphone or a loudspeaker.

EEE 30. The smart glasses according to EEE 25, further comprising:

an inertial sensor assembly for determining a movement state of the smart glasses, the inertial sensor assembly being connected to the processor.

EEE 31. The smart glasses according to EEE 30, wherein the inertial sensor assembly comprises one or a combination of:

a speed sensor for determining a movement speed of the smart glasses;

an acceleration sensor for determining a movement speed of the smart glasses; and a gyroscope for determining information of an included angle between a vertical axis of the smart glasses and a vertical line toward to the earth's core.

EEE 32. A computer readable storage medium, having a computer program stored thereon, wherein the computer program is used for implementing the method of EEEs 16 to 23.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. Smart glasses comprising a processor and a memory, the memory having program instructions stored thereon that, when executed by the processor, cause the smart glasses to:
capture an image;
identify one or more objects in the image;
determine, according to a result of the identifying, whether there is an object at a predefined position or region in the image;
in response to a determination that there is an object at the predefined position or region in the image, inform a user of the object located at the predefined position or region in the image; and
in response to a determination that there is no object at the predefined position or region in the image, determine a location of an object in the image, provide to the user a prompt of turning the user's head towards the location of the object, and change a tone of the prompt according to proximity of the object with respect to the predefined position or region in the image to indicate to the user a degree for turning the head.

2. The smart glasses according to claim 1, wherein the program instructions, when executed by the processor, cause the smart glasses to:
emit laser light via a laser;
capture the image via a first camera;
detect a position of an impact point of the laser light via a second camera; and
determine, according to a preset correlation between the first camera and the second camera, a corresponding position of the impact point of the laser light in the captured image as the predefined position in the image.

3. The smart glasses according to claim 1, wherein the program instructions, when executed by the processor, cause the smart glasses to:
determine, according to the result of the identifying, whether there is a target object at the predefined position or region in the image;
determine, in response to no target object being at the predefined position or region in the image, whether there is the target object at another position or region in the image;
determine, in response to determining that there is the target object at the another position or region in the image, a direction for moving the smart glasses; and
generate, according to the direction for moving the smart glasses, a prompt tone to prompt the user to move in the direction.

4. The smart glasses according to claim 3, wherein the program instructions, when executed by the processor, cause the smart glasses to:
capture a plurality of further images at a predetermined time interval during moving the smart glasses; and
for each of the plurality of further images:
calculate a distance between the target object and the predefined position or region; and
change frequency and/or volume of the generated prompt tone according to the calculated distance.

5. The smart glasses according to claim 3, wherein the program instructions, when executed by the processor, cause the smart glasses to:
adjust the smart glasses into a first operating mode in response to the smart glasses having a movement speed greater than a second preset value;
adjust the smart glasses into a second operating mode in response to the movement speed of the smart glasses being less than the second preset value;
select, according to the result of the identifying and from the identified objects, the object located at the predefined position or region in the image to be informed to the user, in response to the smart glasses being in the first operating mode; and
determine, according to the result of the identifying, whether there is the target object at the predefined position or region in the image, in response to the smart glasses being in the second operating mode.

6. A smart glasses tracking method, comprising:
capturing an image;
identifying one or more objects in the image;
determining, according to a result of the identifying, whether there is an object at a predefined position or region in the image;
in response to a determination that there is an object at the predefined position or region in the image, informing a user of the object located at the predefined position or region in the image; and
in response to a determination that there is no object at the predefined position or region in the image, determining a location of an object in the image, providing to the user a prompt of turning the user's head towards the location of the object, and changing a tone of the prompt according to proximity of the object with respect to the predefined position or region in the image to indicate to the user a degree for turning the head.

7. The method according to claim 6, further comprising:
prompting the user that there is no object at the predefined position or region in the image when there is no object at the predefined position or region in the image.

8. The method according to claim 6, wherein, the predefined position in the image is a central position in the image; and
wherein, the predefined region in the image is a circular or rectangular region at the center of the image that has an area of ⅓ to ½ of that of the image.

9. The method according to claim 6, further comprising emitting laser light, wherein, the laser light is visible light, and the predefined position in the image is a position in the image where the laser light is located.

10. The method according to claim 6, further comprising:
emitting laser light by a laser;
capturing the image by a first camera;
detecting a position of an impact point of the laser light by a second camera; and
determining, according to a preset correlation between the first camera and the second camera, a corresponding position of the impact point of the laser light in the captured image as the predefined position in the image.

11. The method according to claim 6, wherein capturing the image comprises:
capturing the image in response to a movement speed of the smart glasses being less than a first preset value.

12. The method according to claim 6,
wherein the method further comprises:
determining, according to the result of the identifying, whether there is a target object at the predefined position or region in the image;
determining, in response to no target object being at the predefined position or region in the image, whether there is the target object at another position or region in the image;
determining, in response to determining that there is the target object at the another position or region in the image, a direction for moving the smart glasses; and
generating, according to the direction for moving the smart glasses, a prompt tone to prompt the user to move in the direction.

13. The method according to claim 12, further comprising:
capturing a plurality of further images at a predetermined time interval during moving the smart glasses; and
for each of the plurality of further images:
calculating a distance between the target object and the predefined position or region; and
changing frequency and/or volume of the generated prompt tone according to the calculated distance.

14. The method according to claim 12, further comprising:
adjusting the smart glasses into a first operating mode in response to the smart glasses having a movement speed greater than a second preset value;
adjusting the smart glasses into a second operating mode in response to the movement speed of the smart glasses being less than the second preset value;
selecting, according to the result of the identifying and from the identified objects, the object located at the predefined position or region in the image to be informed to the user, in response to the smart glasses being in the first operating mode; and
determining, according to the result of the identifying, whether there is the target object at the predefined position or region in the image, in response to the smart glasses being in the second operating mode.

15. A computer readable storage medium, comprising program instructions stored thereon that, when executed by a processor of smart glasses, cause the smart glasses to:
capture an image;
identify one or more objects in the image;
determine, according to a result of the identifying, whether there is an object at a predefined position or region in the image;
in response to a determination that there is an object at the predefined position or region in the image, inform a user of the object located at the predefined position or region in the image; and
in response to a determination that there is no object at the predefined position or region in the image, determine a location of an object in the image, provide to the user a prompt of turning the user's head towards the location of the object, and change a tone of the prompt according to proximity of the object with respect to the predefined position or region in the image to indicate to the user a degree for turning the head.

16. The computer readable storage medium according to claim 15, wherein the program instructions, when executed by the processor, cause the smart glasses to:
emit laser light via a laser;
capture the image via a first camera;
detect a position of an impact point of the laser light via a second camera; and
determine, according to a preset correlation between the first camera and the second camera, a corresponding position of the impact point of the laser light in the captured image as the predefined position in the image.

17. The computer readable storage medium according to claim 15, wherein the program instructions, when executed by the processor, cause the smart glasses to:
determine, according to the result of the identifying, whether there is a target object at the predefined position or region in the image;
determine, in response to no target object being at the predefined position or region in the image, whether there is the target object at another position or region in the image;
determine, in response to determining that there is the target object at the another position or region in the image, a direction for moving the smart glasses; and
generate, according to the direction for moving the smart glasses, a prompt tone to prompt the user to move in the direction.

18. The computer readable storage medium according to claim 17, wherein the program instructions, when executed by the processor, cause the smart glasses to:
capture a plurality of further images at a predetermined time interval during moving the smart glasses; and
for each of the plurality of further images:
calculate a distance between the target object and the predefined position or region; and
change frequency and/or volume of the generated prompt tone according to the calculated distance.

19. The computer readable storage medium according to claim 17, wherein the program instructions, when executed by the processor, cause the smart glasses to:
adjust the smart glasses into a first operating mode in response to the smart glasses having a movement speed greater than a second preset value;

adjust the smart glasses into a second operating mode in response to the movement speed of the smart glasses being less than the second preset value;

select, according to the result of the identifying and from the identified objects, the object located at the predefined position or region in the image to be informed to the user, in response to the smart glasses being in the first operating mode; and determine, according to the result of the identifying, whether there is the target object at the predefined position or region in the image, in response to the smart glasses being in the second operating mode.

* * * * *